US012812302B2

(12) United States Patent
Winton et al.

(10) Patent No.: US 12,812,302 B2
(45) Date of Patent: Nov. 24, 2026

(54) VEHICLE EXPERIENCE MANAGEMENT

(71) Applicant: Harman International Industries, Incorporated, Stamford, CT (US)

(72) Inventors: Riley Winton, Opelika, AL (US); Maxwell B Willis, Detroit, MI (US); Skyler L Schmidt, Detroit, MI (US); Antonio Gomez, Hazel Park, MI (US); Dishan Song, Munich (DE); Kim Fiskbæk Andreasen, Vildbjerg (DK)

(73) Assignee: Harman International Industries, Incorporated, Stamford, CT (US)

( * ) Notice: Subject to any disclaimer, the term of this patent is extended or adjusted under 35 U.S.C. 154(b) by 201 days.

(21) Appl. No.: 18/400,527

(22) Filed: Dec. 29, 2023

(65) Prior Publication Data

US 2025/0220352 A1 Jul. 3, 2025

(51) Int. Cl.
*H04R 5/04* (2006.01)
*H04R 3/12* (2006.01)

(52) U.S. Cl.
CPC ................. *H04R 5/04* (2013.01); *H04R 3/12* (2013.01); *H04R 2420/01* (2013.01); *H04R 2499/13* (2013.01)

(58) Field of Classification Search
CPC ........ H04R 3/12; H04R 5/04; H04R 2420/01; H04R 2430/01; H04R 2499/13; H04S 7/302; H04S 2400/13
See application file for complete search history.

(56) References Cited

U.S. PATENT DOCUMENTS 10,150,425 B1 12/2018 Scalisi
10,457,179 B1 10/2019 Kentley-Klay
11,930,082 B1 * 3/2024 Singh ....................... H04R 3/12
2015/0365743 A1 12/2015 Konigsberg et al.
2017/0213541 A1 7/2017 Macneille et al.

FOREIGN PATENT DOCUMENTS

GB 2595318 11/2021

OTHER PUBLICATIONS

Extended European Search Report issued in corresponding EP Application 24202252.3, issued May 14, 2025, 13 pages.
Partial European Search Report issued in corresponding EP Application 24202252.3, issued Mar. 4, 2025, 13 pages.

* cited by examiner

*Primary Examiner* — David L Ton
(74) *Attorney, Agent, or Firm* — Burris Law, PLLC

(57) ABSTRACT

A system may receive an input indicative of a selection of passengers, wherein the passengers are situated within the vehicle. A system may determine an output configuration based on the selection of the passengers, wherein the output configuration is indicative of one or more of the first speaker, the second speaker, or the third speaker, and wherein the one or more of the first speaker, the second speaker, or the third speaker is fewer than the first speaker, the second speaker, and the third speaker. A system may provide the content to the one or more of the first speaker, the second speaker, or the third speaker, wherein the provision of the content is based on the output configuration.

17 Claims, 5 Drawing Sheets

500

| Configurations | Passenger 110 | Passenger 112 | Passenger 114 | Passenger 116 |
|---|---|---|---|---|
| 402 — 1 | X | X | | |
| 2 | X | | X | |
| 3 | X | | | X |
| 4 | | X | X | |
| 5 | | X | | X |
| 404 — 6 | | | X | X |
| 7 | X | X | X | |
| 8 | X | | X | X |
| 406 — 9 | | X | X | X |

502

VEHICLE EXPERIENCE MANAGEMENT

BACKGROUND

The statements in this section merely provide background information related to the present disclosure and may not constitute prior art.

Passenger experience for vehicles is generally the same for all passengers in a vehicle. For example, an infotainment system provides a similar experience to all passengers. Conferencing and communication systems, including private phone calls, are audible to all passengers of the vehicle.

SUMMARY

This section provides a general summary of the disclosure and is not a comprehensive disclosure of its full scope or all of its features.

As technology integrates into vehicles, passengers are exposed to various experiences. For example, all of the passengers may be required to participate in a call (e.g., phone call, conference call)—even though fewer than all of the passengers are intended participants. Additionally, passengers may be isolated from conversations, phone calls, or other audio experiences when they are wearing personal audio devices (e.g., earbuds, headphones).

Passengers may be provided with a way to seamlessly integrate with vehicle infotainment, enabling output configurations that are selected by one or more of the passengers. For example, selections may be made to add or remove participants from a call such that all of the selected participants are able to hear the call or engage in the interaction. The passengers may pair audio devices (e.g., speakers, transducers, microphones) with the vehicle infotainment system. A user interface (e.g., display screen within the vehicle, switches, knobs, cellular phone) may be used to select the desired output configuration for the paired devices based on an identifier of the passenger. For example, the passenger may have multiple devices paired with the infotainment system, and each of those devices may be arranged to provide content (e.g., audio input, audio output, video, phone calls, multimedia) based on the output configuration. In such a way, a personalized experience is created for each passenger without social isolation. Multiple output configurations may be activated at the same time. For example, two passengers may be associated with a particular output configuration and another two passengers may be associated with another output configuration.

Further, passenger experience is often impacted by numerous sounds. Each passenger may have specific preferences to the amount of external ambient noise originating from outside the vehicle (e.g., external ambient noise) and the amount of internal ambient noise originating from inside the vehicle (e.g., internal ambient noise). Further, passengers may prefer to have music or other content provided at a particular audio level. A personalized amount of these ambient sounds may be provided. Where noise cancellation is used to reduce the amount of noise, the gain associated with noise cancellation may be adjusted based on the passenger preferences as well. That is, passenger experience may be benefited by an increase in the gain of desired content provided to the passenger and an increase in the gain associated with the reduction of undesirable noise provided to the passenger on an individual or output configuration basis.

In one or more forms, the techniques described herein relate to a method for directing content within a vehicle, wherein the vehicle contains a first speaker, a second speaker, and a third speaker. The method may include receiving an input indicative of a selection of passengers. The passengers may be situated within the vehicle. The method may include determining an output configuration based on the selection of the passengers. The output configuration may be indicative of one or more of the first speaker, the second speaker, or the third speaker, and the one or more of the first speaker, the second speaker, or the third speaker is fewer than the first speaker, the second speaker, and the third speaker. The method may include providing the content to the one or more of the first speaker, the second speaker, or the third speaker, wherein the provision of the content is based on the output configuration.

In one or more forms, the first speaker may be arranged to provide the content to only a first passenger of the vehicle, the second speaker may be arranged to provide the content to only a second passenger of the vehicle, and the third speaker may be arranged to provide the content to only a third passenger of the vehicle. The content may include a Voice-Over Internet Protocol (VOIP) call. In some aspects, the content may include music. The method may include identifying output configurations. Each of the output configurations may include a unique arrangement of output speakers, and each of the output speakers may be associated with a passenger of the vehicle. The selection of the passengers may be based on a user interface element, and the user interface element may be paired with an identifier of a first passenger of the passengers. The identifier may be unique within a group of identifiers associated with the passengers. The selection of the passengers may include an association between a first user interface element and a second user interface element. The first user interface element may be paired with a first identifier of a first passenger of the passengers, and the second user interface element may be paired with a second identifier of a second passenger of the passengers. The first identifier may be unique within a group of identifiers associated with the passengers and the second identifier may be unique within the group of identifiers. The method includes identifying a quantity of the passengers within the vehicle based on a sensor. The sensor is configured to receive electromagnetic energy. The sensor may include one or more weight sensors, and the one or more weight sensors may be configured to provide one or more indications of a presence of one or more of the passengers within the vehicle. The output configuration may be a first output configuration, the method may include switching from the first output configuration to a second output configuration after a period has lapsed. The method may include providing the content to the first speaker, the second speaker, and the third speaker, and the provision of the content may be based on the second output configuration. The output configuration may be a first output configuration. The method may include switching from a second output configuration to the first output configuration after a period has lapsed.

In one or more forms, the techniques described herein relate to a method that includes receiving an input indicative of a selection of an audio level based on one of a plurality of audio sources. The selection may be based on a menu. The menu may include user interface elements indicative of the plurality of audio sources, and the plurality of audio sources includes one or more of engine sounds, ambient noise originated from outside the vehicle, ambient noise originated from inside the vehicle, alerts based on the vehicle, or sirens based on a first responder; and adjusting a gain associated with the content based on the selection of the audio level. The gain may be specific to the one of the plurality of audio sources based on the selection of the audio level. The gain may be associated with noise cancellation applied to the plurality of audio sources.

In one or more forms, the techniques described herein relate to a system including: one or more processors; at least one computer readable medium, wherein the at least one computer readable medium includes instructions, and the instructions upon execution by the one or more processors cause the one or more processors to: receive an input indicative of a selection of passengers, wherein the passengers are situated within a vehicle; determine an output configuration based on the selection of the passengers, wherein the output configuration is indicative of one or more of a first speaker, a second speaker, or a third speaker, and wherein the one or more of the first speaker, the second speaker, or the third speaker is fewer than the first speaker, the second speaker, and the third speaker; and provide content to the one or more of the first speaker, the second speaker, or the third speaker, wherein the provision of the content is based on the output configuration.

In one or more forms, the techniques described herein relate to a system, wherein the first speaker is arranged to provide the content to only a first passenger of the vehicle, the second speaker is arranged to provide the content to only a second passenger of the vehicle, and the third speaker is arranged to provide the content to only a third passenger of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
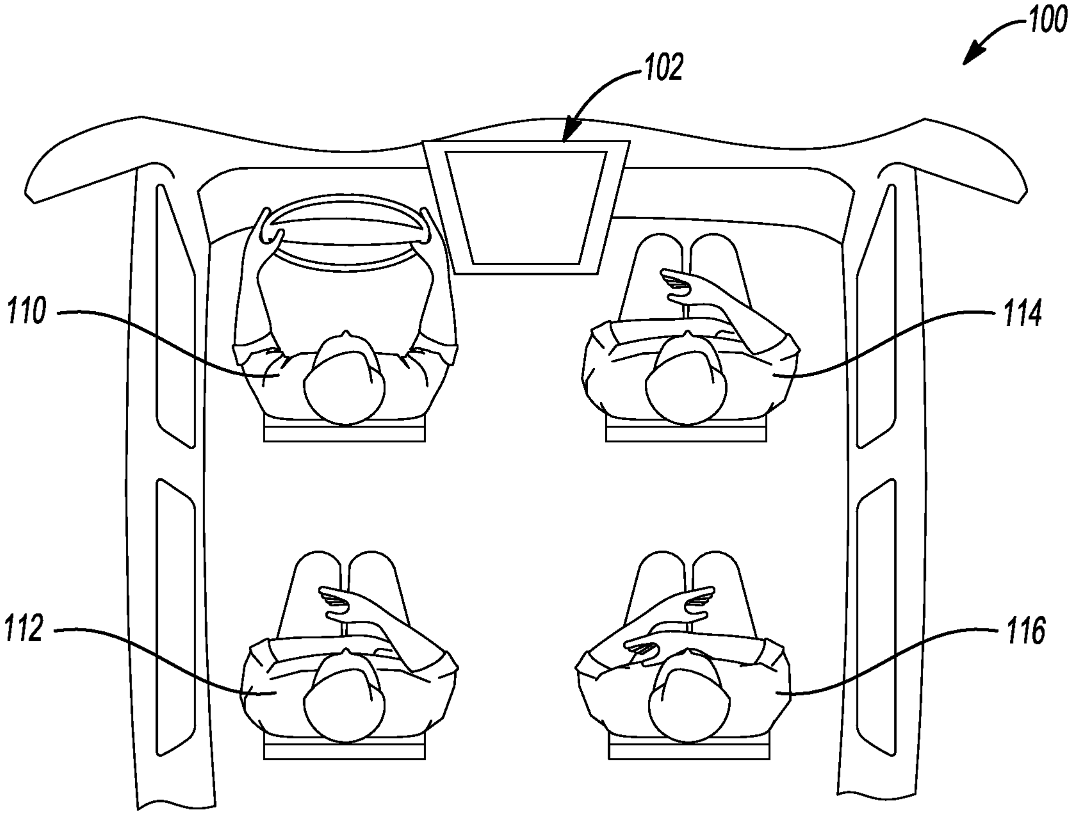
FIG. 1A depicts an overhead view of a vehicle with passengers in accordance with one or more implementations of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
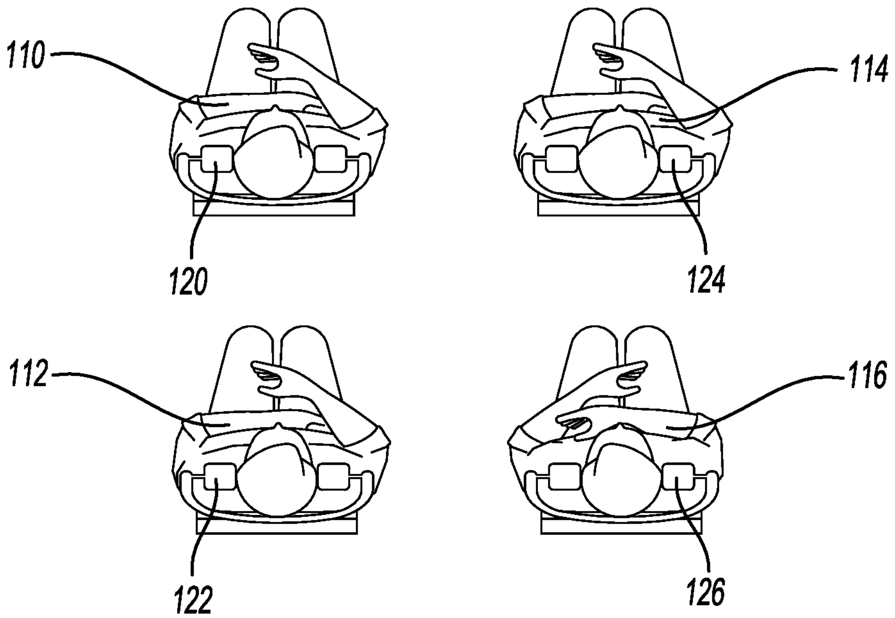
FIG. 1B depicts passengers of the vehicle and speakers in accordance with one or more implementations of the present disclosure.

Referring to FIG. 1A-1B, an overhead view of a vehicle 100 with passengers 110, 112, 114, 116 is shown in accordance with one or more implementations of the present disclosure. The vehicle 100 includes an infotainment system. The infotainment system includes one or more interfaces 102. The interface 102 may be a touch screen or a display. The interface 102 may be associated with one or more input devices (e.g., mice, keyboard, knobs, switches). At least one content input and output device (e.g., speaker 120, 122, 124, 126) is associated with each passenger. For example, each passenger may have at least one audio production device (e.g., speaker) that provides an experience associated with the vehicle. The audio production device may be a headset, earbuds, directional speakers, or another audio source. The content input and output device may provide a mechanism (e.g., microphone) for receiving audio from the passenger (e.g., passenger 110, 112, 114, 116). The content input and output device may provide another sensory output. For example, the content input and output device may provide video or another visual output accessible to the passenger. The sensor may provide an indication of the presence of one or more passengers based on an engagement of a seatbelt or another passenger restraint specific to an individual passenger.

Figure 2:
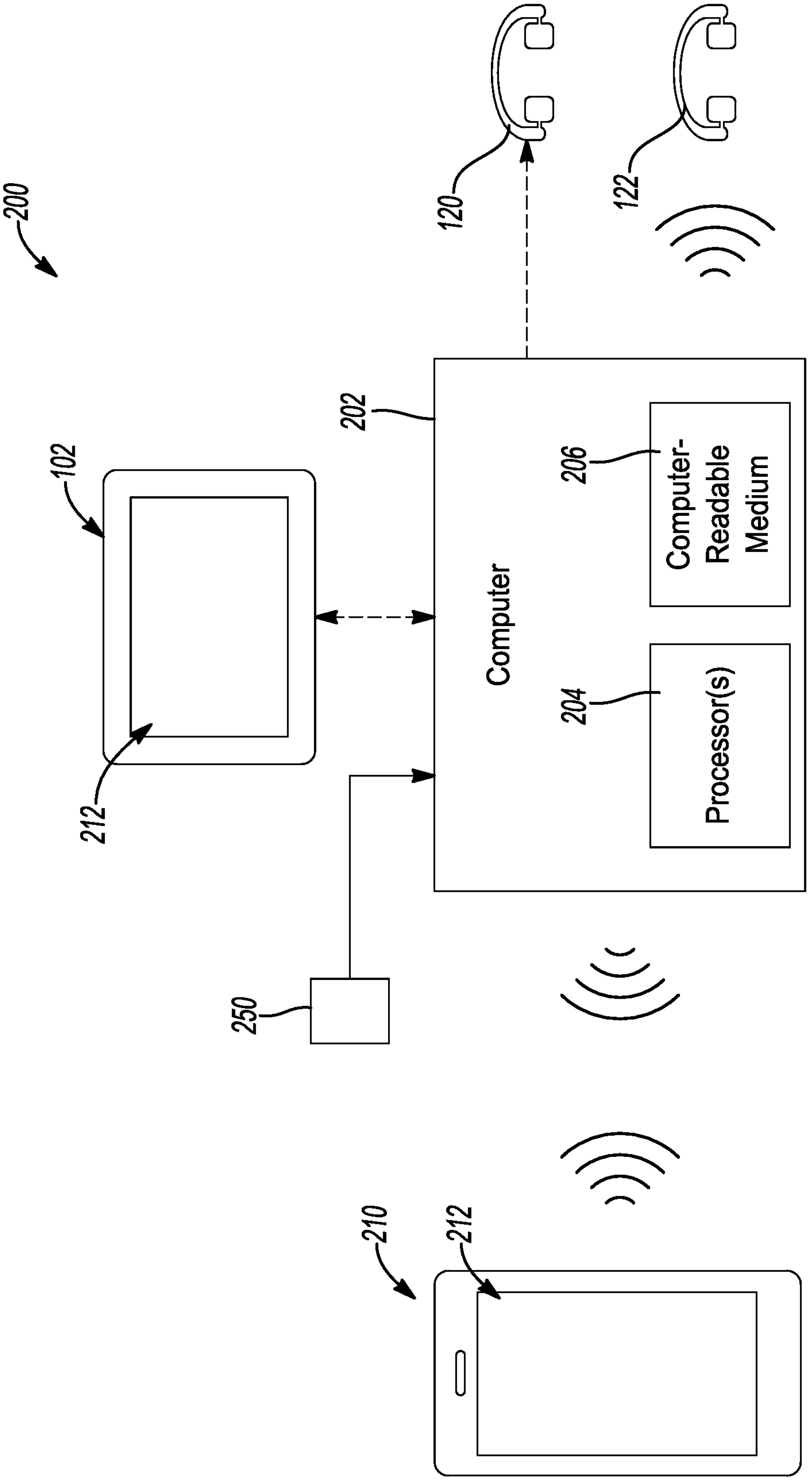
FIG. 2 depicts a system in accordance with one or more implementations of the present disclosure.

Referring to FIG. 2, a system 200 is shown in accordance with one or more implementations of the present disclosure. The system 200 includes one or more interfaces 102, 210. For example, interface 102 may be part of an infotainment system and mounted within the vehicle 100. Interface 210 may be part of a portable phone or another user device (e.g., tablet) available to one or more of the passengers 110, 112, 114, 116. The interfaces 102, 210 may include one or more user interface elements 212. The user interface elements 212 may be part of a graphical user interface (e.g., interface 102, 210). The user interface elements 212 may include one or more icon or visual representations. The user interface elements 212 may be associated with the passengers 110, 112, 114, 116 through one or more unique identifiers of the passenger. For example, each passenger may enter identifying information and set up an account or establish an identity with the system 200. The accounts may each have a respective unique identifier assigned. The unique identifier may be used to represent the passenger 110, 112, 114, 116 within the system 200 and be associated with one or more user interface elements 212.

The interfaces 102, 210 may be associated with a computer 202 or controller. The interfaces 102, 210 may include respective processors and computer readable mediums that are contemplated in this disclosure. The computer 202 comprises one or more processors 204 and at least one computer readable medium 206. The computer readable medium (e.g., the at least one computer readable medium 206) contains instructions that when executed by the one or more processors (e.g., processor 204) cause the one or more processors to carry out one or more steps described herein.

The system 200 may include one or more sensors 250. The sensor 250 may detect or identify passengers 110, 112, 114, 116. For example, the sensor 250 may detect a quantity of the passengers 110, 112, 114, 116 based on a weight sensed for each occupied seat. The sensor 250 may further be a camera configured to receive electromagnetic energy. The sensor 250 may use facial recognition to identify the passengers 110, 112, 114, 116.

Figure 3:
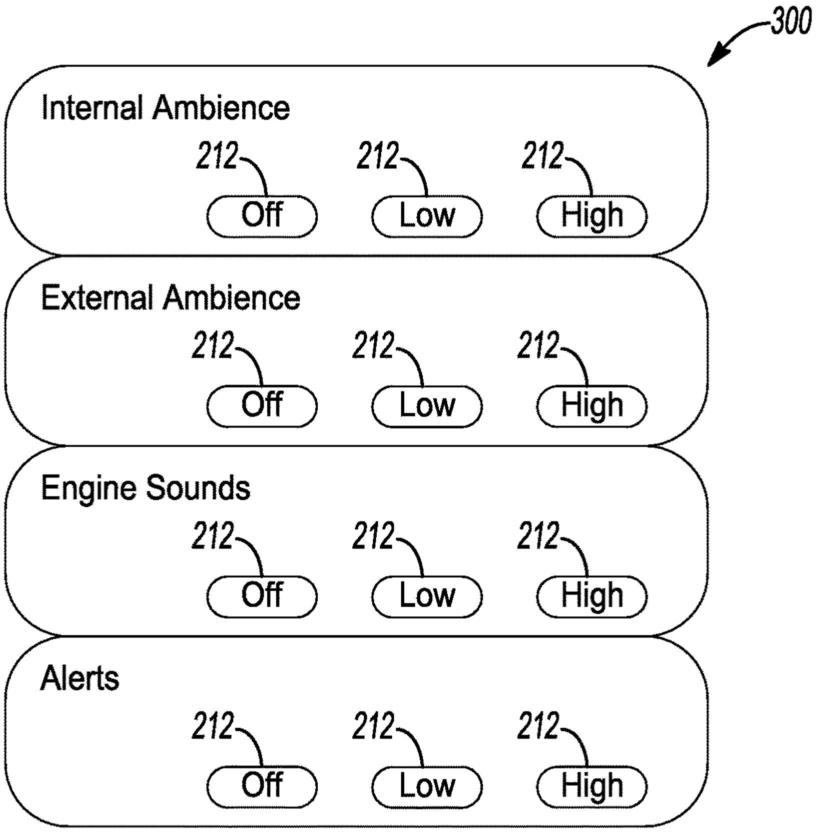
FIG. 3 depicts user interface elements in accordance with one or more implementations of the present disclosure.

Referring to FIG. 3, a menu 300 is shown in accordance with one or more implementations of the present disclosure. The menu 300 comprises user interface elements 212. The user interface elements 212 may be represented on interface 102, interface 210, or another interface. The user interface elements 212 may be indicative of an audio level available for one of a plurality of audio sources (e.g., engine sounds, ambient noise external to the vehicle, ambient noise internal to the vehicle, alerts based on the vehicle, or alerts based on a first responder, content).

The passenger (e.g., passenger 110, 112, 114, 116) may select one or more of the user interface elements to provide an input to the computer 202 that is indicative of the desired volume level (e.g., OFF, LOW, HIGH). The volume level may also be numerical. The volume level may be indicative of a desired gain for the particular audio source. For example, if noise that originates external to the vehicle 100 is diminished through noise cancellation, the selected user interface element pertaining to OFF may increase the gain associated with the noise cancellation to a maximum quantity. Further, if the audio source, such as alerts or content, is entirely provided by the vehicle 100, the selection of the user interface element pertaining to HIGH may increase the gain associated with the audio source to the maximum. The user interface elements 212 may also provide a spectrum of audio levels (e.g., slider bar from 0% to 100%).

Figure 4A:
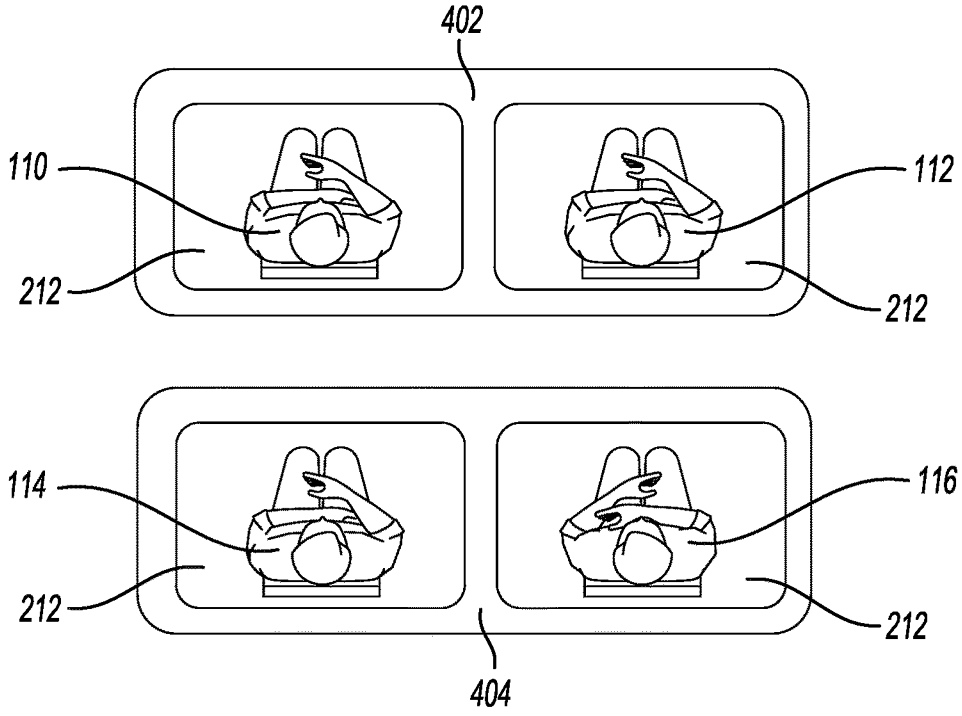
FIG. 4A depicts user interface elements and a selection of one or more configuration in accordance with one or more implementations of the present disclosure.
Figures 4B, 5:
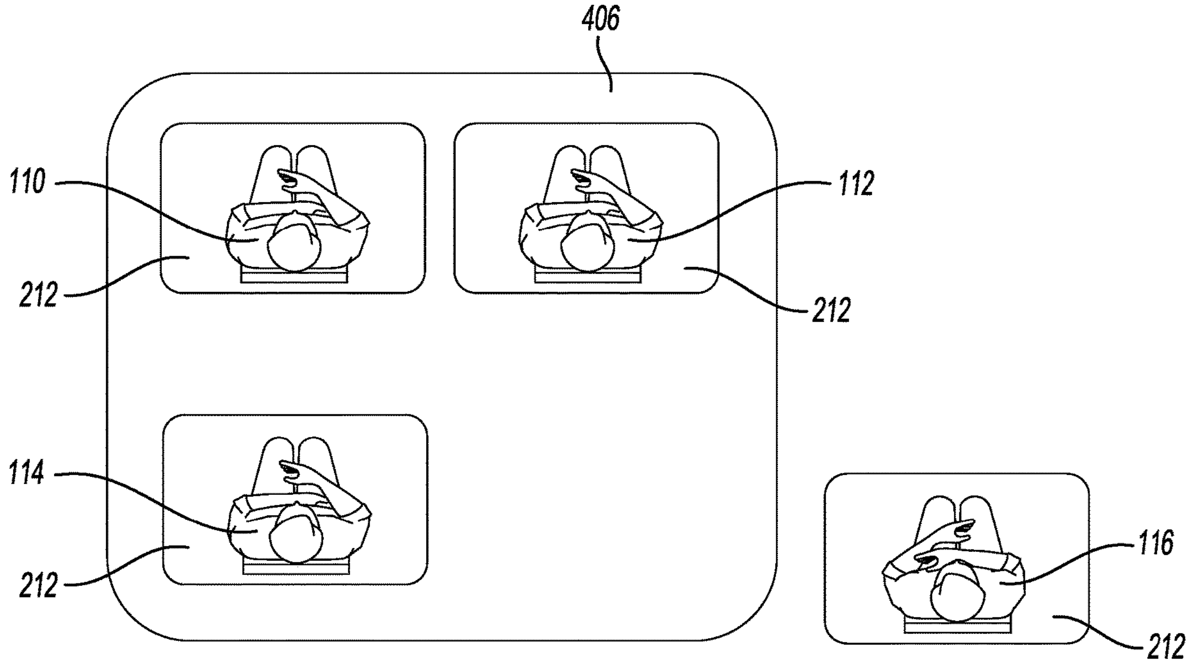
FIG. 4B depicts user interface elements and a selection of a configuration in accordance with one or more implementations of the present disclosure.
FIG. 5 depicts a plurality of configurations in accordance with one or more implementations of the present disclosure.

Referring to FIGS. 4A-4B, user interface elements 212 and a selection of one or more output configurations 402, 404, 406 is shown in accordance with one or more implementations of the present disclosure. The interface 102, 210 provide the passenger (e.g., passenger 110, 112, 114, 116) with selectable user interface elements 212. The user interface elements 212 may be dragged and dropped across the interface 102, 210 to arrange the user interface elements 212 within output configurations 402, 404, 406. For example, the output configurations 402, 404, 406 may include user interface elements 212 that provide icons of particular passengers 110, 112, 114, 116 and cause the content provided to those passengers to be the same. For example, the output configuration 402 is indicative of the selection of passengers 110, 112. The passengers 110, 112 may be provided with content (e.g., audio, video) that is the same or similar. The passengers 110, 112 may be incorporated into the same conference call or phone call. For example, the passengers 110, 112 may have respective content input and output devices (e.g., speakers 120, 122). In such a way, the passenger experience of passengers 110, 112 may be similar without passengers 110, 112 sitting next to each other or being physically proximate (e.g., sitting in the same row).

The output configuration 404 is indicative of the selection of passengers 114, 116. The passengers 114, 116 may be provided with content (e.g., audio, video) that is the same or similar. The passengers 114, 116 may be incorporated into the same conference call or phone call. For example, the passengers 114, 116 may have respective content input and output devices (e.g., speakers 124, 126). In such a way, the passenger experience of passengers 114, 116 may be similar without passengers 114, 116 sitting next to each other or being physically proximate (e.g., sitting in the same row).

The output configuration 406 is indicative of the selection of passengers 110, 112, 114. The passengers 110, 112, 114 may be provided with content (e.g., audio, video) that is the same or similar. The passengers 110, 112, 114 may be incorporated into the same conference call or phone call. For example, the passengers 110, 112, 114 may have respective content input and output devices (e.g., speakers 120, 122, 124). In such a way, the passenger experience of passengers 110, 112, 114 may be similar without passengers 110, 112, 114 sitting next to each other or being physically proximate (e.g., sitting in the same row). The selection of passengers 110, 112, 114 may be fewer than all of the passengers 110, 112, 114. For example, the experience provided to passengers 110, 112, 114 is similar while the same experience is not provided to passenger 116.

Referring to FIG. 5, a plurality of configurations 502, is shown in accordance with one or more implementations of the present disclosure. Each configuration may be associated with a unique identifier. The configuration may be generated based on the number of passengers in the vehicle. For example, the output configurations 502 may be generated by the computer 202 by adding an item to a list with every combination of passengers with at least two passengers and fewer than all of the passengers. For example, when the vehicle 100 is started, the present passengers may be determined by one or more sensors or indications provided to the computer 202. The computer 202 may include instructions to determine unique combinations of each unique identifier (e.g., universally unique identifier (UUID)) associated with each passenger. The output configurations 502 may be determined iteratively until all of the output configurations are stored within the data structure 500. The output configurations 502 and data structure 500 may be further associated with information necessary to produce the content. For example, the data structure 500 may further indicate the content input and out devices associated with each passenger and providing with those devices. For example, the data structure 500 may include an indication of the BLUETOOTH identifiers associated with each of the devices to ensure that the output combinations 502 provide the proper content to the specific passengers 110, 112, 114, 116 through the associated content input and output devices (e.g., speakers 120, 122, 124, 126).

Figure 6:
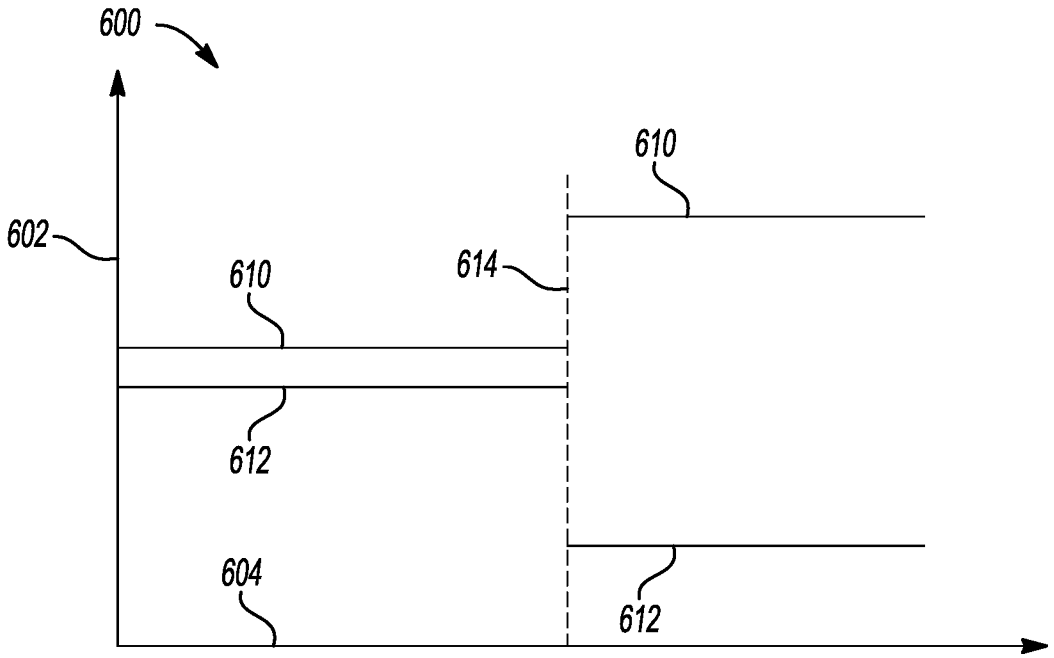
FIG. 6 depicts one or more gains in accordance with one or more implementations of the present disclosure.

Referring to FIG. 6, one or more gains 610, 612 are shown in accordance with one or more implementations of the present disclosure. The gains, 610, 612 are shown with respect to magnitude 602 over time 604. The gains may be associated with an amplifier. The amplifier may be digital or analog. The amplifier may be associated with individual output devices (e.g., speakers 120, 122, 124, 126) or provided by the computer 202 as part of the infotainment system. Gain 612 may be associated with a noise cancellation algorithm and impact the magnitude of noise cancellation provided to one or more passengers 110, 112, 114, 116 based on the output configuration or otherwise. Gain 614 may be associated with the provision of content to one or more passengers 110, 112, 114, 116 based on the output configuration or otherwise.

Figure 7:
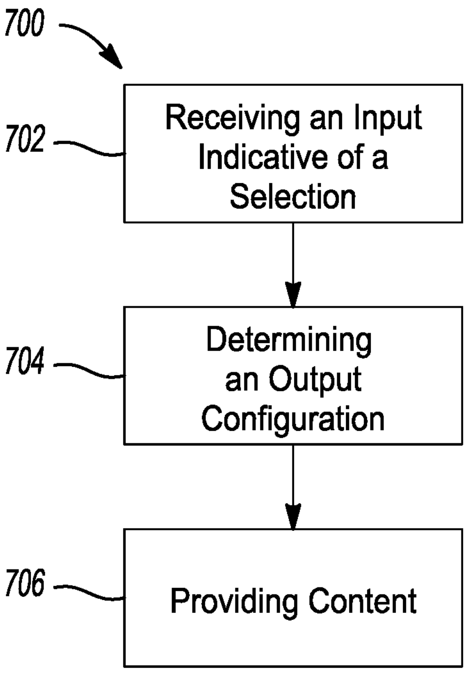
FIG. 7 depicts a method in accordance with one or more implementations of the present disclosure.

Referring to FIG. 7, a method 700 is shown in accordance with one or more implementations of the present disclosure. The method 700 includes steps that may be omitted, duplicated, or rearranged. The method 700 may be associated with directing content within a vehicle 100. The content may be a video, audio input, audio output, conference call, or otherwise. In step 702, an input is received. The input may be digital, analog, data, or otherwise. The input may be received by one or more components (e.g., computer 202.

The input may be indicative of a selection of the passengers. For example, the selection of passengers may be made on an interface in the vehicle (e.g., interface 102) or a user device (e.g., 210). The selection may be made with user interface elements 212. For example, the user interface elements 212 may be dragged and dropped to associated passengers with a particular output configuration 502.

In step 704, an output configuration 502 is determined based on the selection of passengers. For example, the output configuration 502 may be determined by a process of elimination of those output configurations specified within data structure 500. The computer 202 may compare the indicated passengers (e.g., 110, 112) and remove output configurations that do not comprise those passengers. The computer 202 may further remove output configurations that comprise more passengers than the quantity of passengers specified (e.g., two). The computer 202 may then provide content to the indicated content input and out devices (e.g., speakers 120, 122) based on the selection of passengers. The quantity of input and output devices may be fewer than all of the available output devices and more than two.

In step 706, the content is provided to the content input and output devices indicated by the determined output configuration (e.g., 402). For example, the video, call, or other content may be provided only to devices associated with passengers 110, 112 (e.g., speakers 120, 122) and not devices associated with passengers 114, 116 (e.g., speakers 124, 126). Each speaker may be configured to only provide the content to one passenger (e.g., headphone, earbud, privacy screen). The content may be provided by an internet protocol (IP) or circuit-based switching (e.g., S7). For example, a voice-over-IP (VOIP) protocol (e.g., H.323, Real-time transport protocol) may be used.

The method 700 may further include e identifying output configurations. For example, the output configurations 502 may be stored in a data structure 500. The available output configurations 502 may be generated based on the quantity of passengers in the vehicle. For example, the output configurations 502 may be generated by the computer 202 by adding an item to a list with every combination of passengers with at least two passengers and fewer than all of the passengers. For example, when the vehicle 100 is started, the present passengers may be determined by one or more sensors (e.g., weight, camera) or an indication provided to the computer 202. The computer 202 may include instructions to determine unique combinations of each unique identifier (e.g., universally unique identifier (UUID)) associated with each passenger 110, 112, 114, 116. The output configurations 502 may be determined iteratively until all of the output configurations 502 are stored within the data structure 500. The output configurations 502 may be reduced to not include a configuration with every passenger present within the vehicle or only one of the passengers. The output configurations 502 and data structure 500 may be further associated with information necessary to produce the content. For example, the data structure 500 may further indicate the content input and out devices associated with each passenger and providing with those devices. For example, the data structure 500 may include an indication of the BLUETOOTH identifiers associated with each of the devices to ensure that the output combinations 502 provide the proper content to the specific passengers 110, 112, 114, 116 through the associated content input and output devices (e.g., speakers 120, 122, 124, 126).

The quantity or identity of the passengers 110, 112, 114, 116 may be indicated or determined. For example, users may log in using a phone, tablet, or interface 102 to provide an indication of the quantity and identity of the passengers. The identity may be associated with the unique identifier. The quantity or identity of passengers may be identified by one or more sensors. For example, a weight sensor (e.g., strain gauge) may be used to determine the quantity of passengers 110, 112, 114, 116 and their location throughout the cabin of the vehicle 100. For example, the weight sensor may be placed within each seat of the vehicle to determine occupancy. A camera or another electromagnetic device may be used to determine the identity of passengers with facial recognition or other implements. For example, the sensor may be situated within the vehicle 100 to recognize passengers. In one or more variations, the sensor is configured to send or receive 2.4 GHz or 60 GHz signals.

The method 700 may include switching between output configurations. For example, after a period has lapsed or content is finished. The computer 202 may include instructions to switch between output configurations based on the status of the content being provided. After a call has been completed or disconnected, the computer 202 may automatically switch back to a different output configuration 502 or another configuration. For example, return to a general experience for all passengers. After a movie has concluded, the computer 202 may adjust the output configuration 404 to output configuration 406 to include an additional passenger (e.g., passenger 112). In such a way, the computer 202 may switch between configurations 502 based on a condition.

Figure 8:
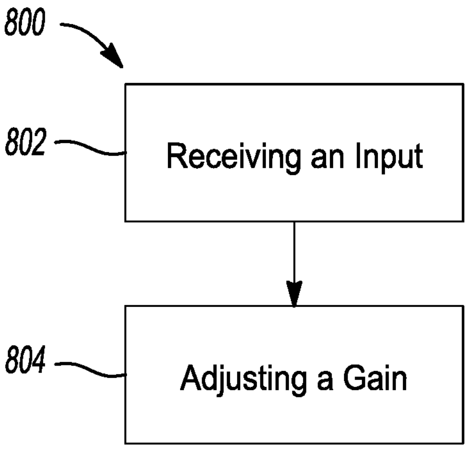
FIG. 8 depicts a method in accordance with one or more implementations of the present disclosure.

FIG. 8 depicts a method 800 in accordance with one or more implementations of the present disclosure. The method 800 includes steps 802, 804 that may be omitted, rearranged, or duplicated. The steps associated with method 800 may be combined in any way with the steps associated with method 700.

In step 802, an input is received. The input may be received by computer 202 or another device. The input may be based on one or more user interface elements 212. The input may be indicative of a selection of an audio level. The audio level may be based on one of a plurality of audio sources. For example, the audio sources may include one or more of engine sounds, ambient noise external to the vehicle, ambient noise internal to the vehicle, alerts based on the vehicle, or alerts based on a first responder. The audio sources may also include content such as phone calls, music, or video.

In step 804, a gain may be adjusted. For example, gain 610, 612 may be adjusted to alter the experience of one or more passengers. The gain (e.g., gain 610, 612) may be associated with a noise cancellation algorithm that might reduce noise generated external to the vehicle 100 or by the vehicle 100. The gain may also increase the sounds. For example, cautious drivers may desire to increase alerts or sirens from a first responder (e.g., firetruck, ambulance, police car).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for directing content within a vehicle, wherein the vehicle contains a first speaker, a second speaker, and a third speaker, the method comprising:

receiving an input indicative of a selection of passengers, wherein the passengers are situated within the vehicle, and wherein the selection of passengers includes fewer than all passengers situated within the vehicle;

determining an output configuration based on the selection of the passengers, wherein the output configuration is indicative of one or more of the first speaker, the second speaker, or the third speaker, and wherein the one or more of the first speaker, the second speaker, or the third speaker is fewer than the first speaker, the second speaker, and the third speaker, and wherein the output configuration causes a same content to be provided to the selection of passengers; and providing the content to the one or more of the first speaker, the second speaker, or the third speaker, wherein the provision of the content is based on the output configuration, and wherein the content is not provided to at least one remaining speaker of the first speaker, the second speaker, or the third speaker that is not indicated by the output configuration.

2. The method of claim 1, wherein the first speaker is arranged to provide the content to only a first passenger of the vehicle, the second speaker is arranged to provide the content to only a second passenger of the vehicle, and the third speaker is arranged to provide the content to only a third passenger of the vehicle.

3. The method of claim 1, wherein the content comprises a Voice-Over Internet Protocol (VOIP) call.

4. The method of claim 1, wherein the content comprises music.

5. The method of claim 1, further comprising:

identifying output configurations, wherein each of the output configurations comprises a unique arrangement of output speakers, and each of the output speakers is associated with a passenger of the vehicle.

6. The method of claim 1, wherein the selection of the passengers is based on a user interface element, wherein the user interface element is paired with an identifier of a first passenger of the passengers.

7. The method of claim 6, wherein the identifier is a unique within a group of identifiers associated with the passengers.

8. The method of claim 1, wherein the selection of the passengers comprises an association between a first user interface element and a second user interface element.

9. The method of claim 8, wherein the first user interface element is paired with a first identifier of a first passenger of the passengers, and the second user interface element is paired with a second identifier of a second passenger of the passengers.

10. The method of claim 9, wherein the first identifier is unique within a group of identifiers associated with the passengers and the second identifier is unique within the group of identifiers.

11. The method of claim 1, further comprising:

identifying a quantity of the passengers within the vehicle based on a sensor.

12. The method of claim 11, wherein the sensor is configured to receive electromagnetic energy.

13. The method of claim 11, wherein the sensor comprises one or more weight sensors, and wherein the one or more weight sensors are configured to provide one or more indications of a presence of one or more of the passengers within the vehicle.

14. The method of claim 1, wherein the output configuration is a first output configuration, the method further comprising:

switching from the first output configuration to a second output configuration after a period has lapsed; and providing the content to the first speaker, the second speaker, and the third speaker, wherein the provision of the content is based on the second output configuration.

15. The method of claim 1, wherein the output configuration is a first output configuration, the method further comprising:

switching from a second output configuration to the first output configuration after a period has lapsed.

16. A system comprising:

one or more processors;

at least one computer readable medium, wherein the one or more computer readable medium comprises instructions, and the instructions upon execution by the one or more processors cause the one or more processors to:

receive an input indicative of a selection of passengers, wherein the passengers are situated within a vehicle, and wherein the selection of passengers includes fewer than all passengers situated within the vehicle;

determine an output configuration based on the selection of the passengers, wherein the output configuration is indicative of one or more of a first speaker, a second speaker, or a third speaker, and wherein the one or more of the first speaker, the second speaker, or the third speaker is fewer than the first speaker, the second speaker, and the third speaker, wherein the output configuration causes a same content to be provided to the selection of passengers; and provide content to the one or more of the first speaker, the second speaker, or the third speaker, wherein the provision of the content is based on the output configuration, and wherein the content is not provided to at least one remaining speaker of the first speaker, the second speaker, or the third speaker that is not indicated by the output configuration.

17. The system of claim 16, wherein the first speaker is arranged to provide the content to only a first passenger of the vehicle, the second speaker is arranged to provide the content to only a second passenger of the vehicle, and the third speaker is arranged to provide the content to only a third passenger of the vehicle.

* * * * *